United States Patent
Song et al.

(10) Patent No.: US 7,623,522 B2
(45) Date of Patent: Nov. 24, 2009

(54) METHOD FOR REQUESTING DOMAIN TRANSFER AND TERMINAL AND SERVER THEREOF

(75) Inventors: Jae-Seung Song, Seoul (KR);
Kyung-Ae Yoon, Gyeonggi-Do (KR);
Mi-Soon Ra, Seoul (KR); Hyun-Sook Kim, Seoul (KR); Hede Patrice, Enghien-les-bains (FR)

(73) Assignee: LG Electronics Inc., Seoul (KR)

( * ) Notice: Subject to any disclaimer, the term of this patent is extended or adjusted under 35 U.S.C. 154(b) by 528 days.

(21) Appl. No.: 11/702,056

(22) Filed: Feb. 5, 2007

(65) Prior Publication Data

US 2007/0195785 A1 Aug. 23, 2007

Related U.S. Application Data

(60) Provisional application No. 60/765,212, filed on Feb. 6, 2006.

(30) Foreign Application Priority Data

Nov. 23, 2006 (KR) ............... 10-2006-0116575
Dec. 27, 2006 (KR) ............... 10-2006-0135622

(51) Int. Cl.
*H04L 12/56* (2006.01)
(52) U.S. Cl. ................... 370/395.2; 370/331
(58) Field of Classification Search .............. None
See application file for complete search history.

(56) References Cited

U.S. PATENT DOCUMENTS

| 2005/0047399 A1 | 3/2005 | Lee et al. | |
| 2006/0209805 A1* | 9/2006 | Mahdi et al. | 370/352 |
| 2007/0014281 A1* | 1/2007 | Kant | 370/352 |
| 2007/0165612 A1* | 7/2007 | Buckley | 370/356 |

FOREIGN PATENT DOCUMENTS

WO  WO 2005/039132 A1  4/2005

OTHER PUBLICATIONS

3GPP TR 23.806 V1.4.0, Voice Call Continuity between CS and IMS Study, 159 pages, 2005.*

* cited by examiner

*Primary Examiner*—Frank Duong
(74) *Attorney, Agent, or Firm*—Birch, Stewart, Kolasch & Birch, LLP

(57) ABSTRACT

A method, terminal and server for controlling a domain transfer operation, are discussed. According to an embodiment, the server includes a receiver to receive a domain transfer request; a controller to evaluate the domain transfer request based on criteria information, to determine whether or not to generate a domain transfer request message based on the evaluation result, and to generate the domain transfer request message based on the determination result; and a transmitter to transmit the domain transfer request message to at least one terminal so as to selectively initiate a domain transfer for a call.

36 Claims, 4 Drawing Sheets

METHOD FOR REQUESTING DOMAIN TRANSFER AND TERMINAL AND SERVER THEREOF

The present application claims the priority benefits of U.S. Provisional Application No. 60/765,212 filed on Feb. 6, 2006 and Korean Patent Application Nos. 10-2006-0116575 and 10-2006-0135622 respectively filed on Nov. 23, 2006 and Dec. 27, 2006 in Republic of Korea. The entire contents of these applications are herein fully incorporated by reference.

BACKGROUND OF THE INVENTION

1. Field of the Invention

The present invention relates to a Voice Call Continuity (VCC), and more particularly, to requesting a domain transfer in the VCC.

2. Discussion of the Background Art

In general, a Voice Call Continuity (VCC) refers to a type of application, namely, a home IMS (IP Multimedia Subsystem) application which is capable of transporting voice calls between a CS (Circuit Switching) domain and an IMS domain. The VCC provides functions of voice call originations, voice call terminations, a domain selection and a domain transfer from the CS domain to the IMS domain or vice versa. Here, the domain transfer refers to transferring access legs for voice calls toward a user equipment (UE) (i.e., a terminal) from the CS domain to the IMS domain or vice versa during an active session. The access leg denotes a call control leg between a VCC UE and a Domain Transfer Function (DTF) of an VCC application (server).

Through the domain transfer procedures, a service continuity for one or more voice calls/sessions is provided between the IMS domain and the CS domain while the VCC UE maintains the one or more voice calls/sessions.

Generally, a domain transfer for a certain voice call/session from the CS domain to the IMS domain or vice versa is initiated only when a DTF is positioned on a signal path of the voice call/session setup. For this, positioning of the DTF on the way of the signal path of the voice call/session setup is referred to as anchoring in IMS or anchoring.

FIG. 1 illustrates a general architecture of a network for providing a VCC service.

As illustrated in FIG. 1, a VCC UE 10 denotes all types of terminals which support the VCC service. The VCC UE can access CS and PS (packet switching) domains. That is, when accessing the CS domain, the VCC UE uses a UE-CS (not shown) provided therein, whereas the VCC UE uses a UE-IMS (not shown) provided therein when accessing the PS domain.

A VCC application 30 is an application server for providing the VCC service, and is constituted with entities which perform a series of functions. The series of functions may include functions required to setup voice calls toward the VCC UE, and functions required to switch an access leg of the VCC UE between the CS domain and the IMS domain while maintaining (performing) an active session. For instance, the series of functions can be a Domain Transfer Function 30a, a Domain Selection Function 30d, a CS Adaptation Function 30b, and a CAMEL Service Application 30c. Detailed capabilities and operations for the series of functions are described in 3GPP TS 23.206 V1.2.0.

Generally, the CS domain entities include a Visited Mobile Switching Center (VMSC), a Gateway MSC (GMSC), a gsm-SCF, and the like. The IMS domain entities include a P-CSCF, a S-CSCF, a I-CSCF and a Media Gateway Control Function (MGCF).

FIG. 2 is a signal flowchart among each component of a network (e.g., the network shown in FIG. 1) in a case where a domain transfer occurs between the IMS domain and CS domain. Hereinafter, domain transfer procedures in a VCC service according to a background art will be explained with reference to FIG. 2.

As shown in FIG. 2, it is just a VCC UE which initiates a domain transfer in a VCC. That is, the VCC UE establishes a voice call (or session) over the CS domain or IMS domain with a network, and then may decide whether or not to initiate a domain transfer by moving (or transferring) from one domain to another domain. By doing this, the established voice call (so-called "ongoing call") may continue on the way of handing over (i.e., domain transfer) from the CS domain to the IMS domain or vice verse. Here, for initiating (performing) a domain transfer for the voice call from one domain (e.g., IMS domain) to another domain (e.g., CS domain), the VCC UE may initiate the domain transfer based on previously-stored information. Here, the information previously stored in the VCC UE may include radio conditions of a CS network to access, operator policy, user preferences, and the like.

Procedures (1)~(4) of initiating, by the VCC UE, a domain transfer from a CS domain to an IMS domain according to the background art are as follows:

(1) The VCC UE may decide to initiate a domain transfer for a voice call which has been originated and is ongoing toward the CS domain, namely, an outgoing call.

(2) When the VCC UE sends an INVITE message to a VCC application, a Domain Transfer Function (DTF) in the VCC application establishes an IMS session leg for the voice call over the IMS domain.

(3) After the IMS session leg is established between the DTF and the IMS domain, the DTF routs the ongoing session to the IMS domain.

(4) After routing the ongoing session to the IMS domain, a CS session leg is released.

Thus, the domain transfer for the voice call is initiated from the CS domain to the IMS domain through the procedures of (1)~(4).

For the domain transfer in the VCC, only the VCC UE can initiate the domain transfer in the current VCC by taking into account certain criteria (e.g., user preferences, operator policies, etc.). Therefore, according to the background art, there is no way for the network (e.g., VCC application) to initiate a domain transfer based upon a current network state, a data load of a specific node, a sustainable QoS (Quality of Service), or the location of the VCC UE.

Further, the network may want to reduce traffic or stop the flow of traffic over a specific domain during a certain time duration for maintenance or upgrading of the network. In this case, according to the background art, there is no method for the network to allow (or request) the VCC UE to initiate the domain transfer for a current call over a specific domain (i.e., over the CS domain or IMS domain).

SUMMARY OF THE INVENTION

Therefore, it is an object of the present invention to request, by a network (e.g., VCC application). a terminal (e.g., VCC UE) to initiate a domain transfer according to a network state or other reasons.

It is another object of the present invention to provide a method and device for requesting a domain transfer, which address the limitations and disadvantages associated with the background art To achieve these and other objects according to the present invention, there is provided according to an aspect of the present invention a method for requesting a domain transfer to be initiated, comprising: evaluating domain transfer request information received in a network server; transferring, by the network server, a domain transfer request message to the terminal based upon the evaluation of the domain transfer request information; receiving and evaluating the domain transfer request message by the terminal; and deciding, by the terminal, whether to initiate the domain transfer for a call based upon the evaluated domain transfer request message.

To achieve these and other objects of the present invention, there is provided according to another aspect of the present invention a terminal (or UE) comprising: a receiver for receiving a domain transfer request message from a network server; a transmitter for sending a response message with respect to the received domain transfer request message; and a VCC enabler for deciding whether or not to initiate a domain transfer for an ongoing call by evaluating the domain transfer request message, and then initiating the domain transfer according to the decision.

To achieve these and other objects of the present invention, there is provided according to another aspect of the present invention a network server comprising: a receiver for receiving a domain transfer request information and also receiving a response message transferred by a terminal; an evaluating unit for evaluating the received domain transfer request information by comparing it with previously stored conditions; a message generator for generating a domain transfer request message based upon the evaluated domain transfer request information; and a transmitter for sending the generated domain transfer request message to the terminal.

According to another aspect, the present invention provides a terminal for controlling a domain transfer operation, comprising: a receiver to receive a message from a network server, the message including domain transfer related information; and a controller to evaluate the domain transfer related information and at least one of user preference information and operator policy information, to determine whether to initiate a domain transfer of a call based on the evaluation result, and to selectively initiate the domain transfer based on the determination result.

According to another aspect, the present invention provides a terminal for controlling a voice call continuity (VCC) operation, comprising: a receiver to receive a message from a network server, the message including domain transfer related information; and a controller to evaluate the message including the domain transfer related information, to determine whether to initiate a domain transfer of a call based on the evaluation result, and to selectively initiate the domain transfer based on the determination result.

According to another aspect, the present invention provides a network device for controlling a domain transfer operation, comprising: a controller to analyze domain transfer request information based on criteria information, and to generate a domain transfer request message based on the analysis result; and a transmitter to transmit the domain transfer request message to at least one terminal, for controlling the terminal to selectively initiate a domain transfer of an ongoing call.

According to another aspect, the present invention provides a server for controlling a domain transfer operation, comprising: a receiver to receive a domain transfer request; a controller to evaluate the domain transfer request based on criteria information, to determine whether or not to generate a domain transfer request message based on the evaluation result, and to generate the domain transfer request message based on the determination result; and a transmitter to transmit the domain transfer request message to at least one terminal so as to selectively initiate a domain transfer for a call.

According to another aspect, the present invention provides a method of controlling a domain transfer operation, comprising: determining, by a network server, whether or not to request an initiation of a domain transfer of a call; generating, by the network server, a message based on the determination result, the message including a request to a terminal for an initiation of a domain transfer of a call; and transmitting, by the network server, the message to at least one terminal.

According to another aspect, the present invention provides a method for controlling a domain transfer operation, comprising: receiving, by a terminal, a domain transfer request message from a network server, the domain transfer request message including domain transfer related information; evaluating, by the terminal, the domain transfer related information and at least one of user preference information and operator policy information; determining, by the terminal, whether to initiate a domain transfer of an ongoing call based on the evaluation result; and selectively initiating, by the terminal, the domain transfer of the ongoing call based on the determination result.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention.

DETAILED DESCRIPTION OF THE PREFERRED EMBODIMENTS

Figure 1:
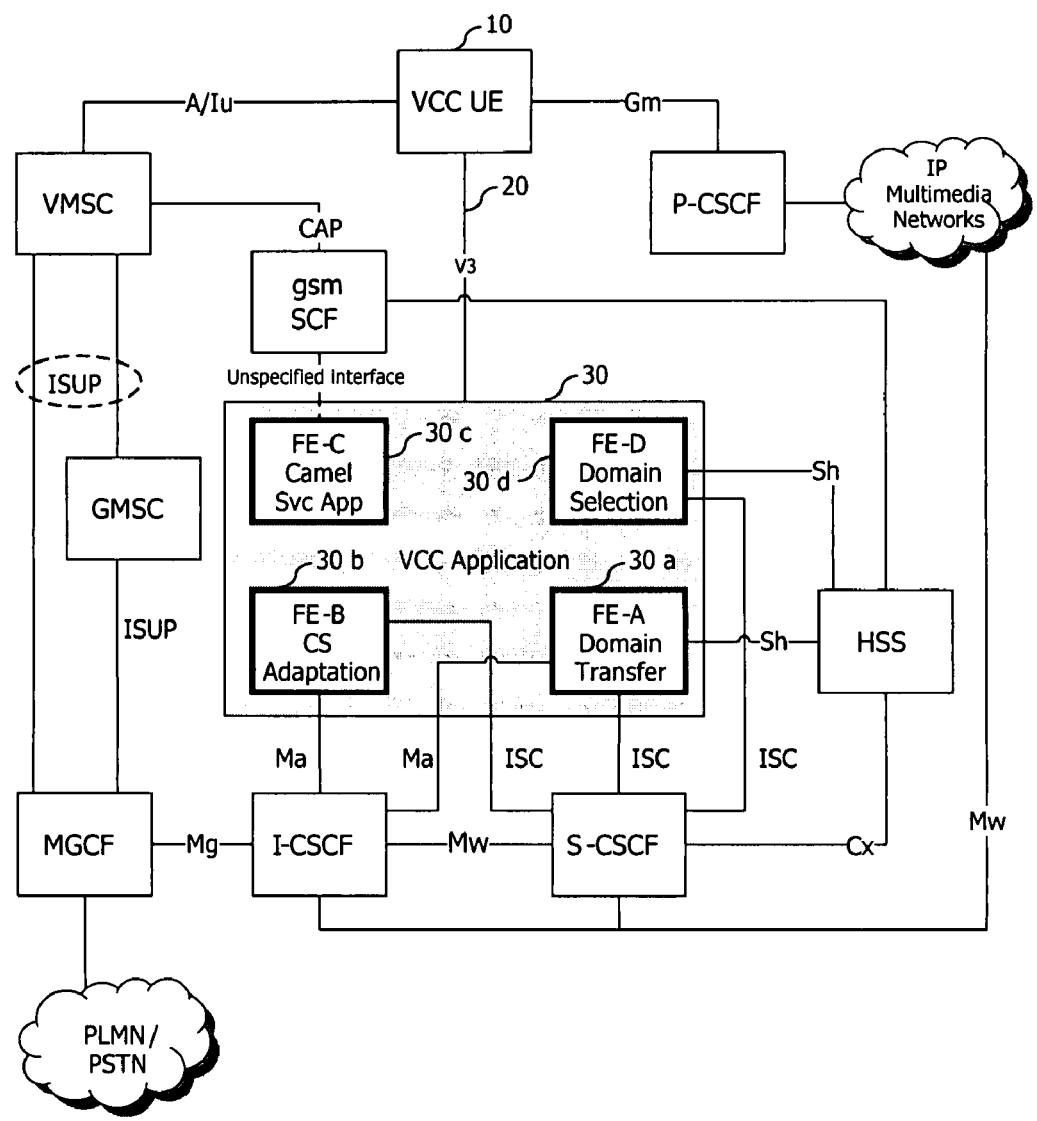
FIG. 1 is a network architecture for providing a VCC service, in which the present invention can be implemented.
Figure 2:
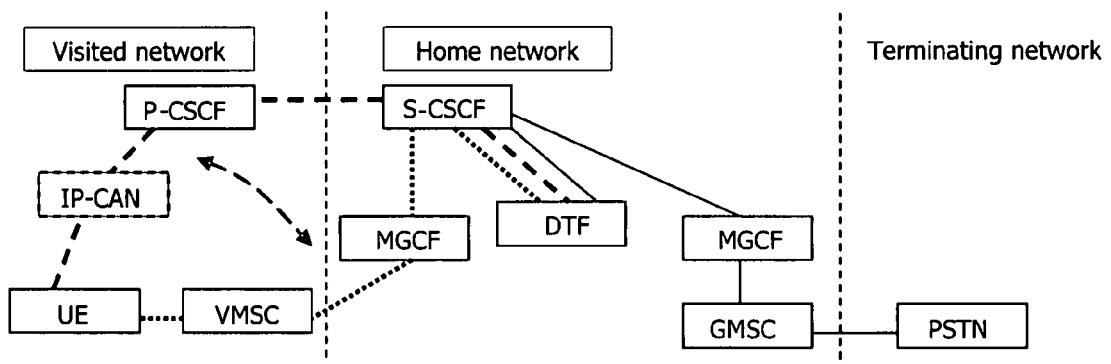
FIG. 2 is a signal flowchart among components of a network for a domain transfer between an IMS domain and a CS domain according to a background art.

The present invention is applied to a Voice Call Continuity (VCC) in 3GPP (3rd Generation Partnership Project), but it may be applicable to other communication fields.

Substantially in the present invention, first, a network server (e.g., VCC application server) transfers to one or more UEs (i.e., terminal(s)) a message which includes information related to a domain transfer request (this information is also referred to as domain transfer related information). The domain transfer related information can include, but is not limited to, one or more of the following: domain transfer level information (information regarding a level (or class) of a domain transfer request), network state information (information regarding a network state or the like), evaluation information (information regarding an evaluation (or analysis) of a domain transfer request made by an external node or internal module of the network server or the like), etc. The message including the domain transfer related information can include other information, and can be a message for other purpose.

Second, the UE receives the message including the domain transfer related information from the network server, and decides whether or not to initiate (perform) the domain transfer with respect to a call (e.g., an ongoing call or any subsequent call) based upon the information. The UE according to the present invention decides whether or not to initiate the domain transfer with respect to the calls based upon the domain transfer related information alone, or upon the domain transfer related information with at least one of operator policy and user preferences. However, considering all of the operator policy, user preferences that the UE itself has as well as the received domain transfer related information is preferred.

Hereinafter, terms preferably used to describe the present invention will be defined.

A UE according to the present invention may include all types of terminals which can be used for the VCC service. For instance, the UE according to the present invention comprehensively includes mobile communications terminals (e.g., UEs, mobile phones, cellular phones, DMB phones, DVB-H phones, PDAs, PTT, etc.), digital TV sets, GPS navigation devices, portable game machines, MP3, other home appliances, and the like.

User preferences denotes information (or parameter) for defining information related to a domain selection (or domain transfer) which indicates what domain the UE user prefers to use for ongoing calls (e.g., incoming or outgoing calls) when the UE (or terminal) is available over both the CS domain and IMS domain.

Operator policy denotes information related to a network state or a network management. The operator policy may frequently be updated depending on the network state or for the network management. The updated operator policy may include information for requesting a domain transfer for ongoing calls (or subsequent calls), and/or information on a domain preferred by the network for the domain transfer.

An ongoing call denotes a call in progress between a UE and a VCC application, which includes all of the incoming or outgoing calls. The present invention is applicable to ongoing calls, but is not limited thereto and can be applied to subsequent calls.

A 'V3 interface' used in the present invention preferably denotes an interface for a mutual information transfer between a UE and a VCC application. For instance, the V3 interface is shown as 20 in FIG. 1 as an example. The V3 interface may be include a Ut interface, and an OMA DM (device management). That is, an information transfer from the UE to the VCC application can be achieved by use of the Ut interface, whereas an information transfer from the VCC application to the UE can be achieved by use of the DM using a DM method. As another example, the V3 interface method may include an unstructured supplementary service data (USSD) method. The Ut interface, the DM method and the USSD method are known in the art. A protocol of the V3 interface may exemplarily be a HTTP, which has a XML format.

Hereinafter, constructions and operations of the preferred embodiments of the present invention will be explained in detail with reference to the accompanying drawing.

Figure 3:
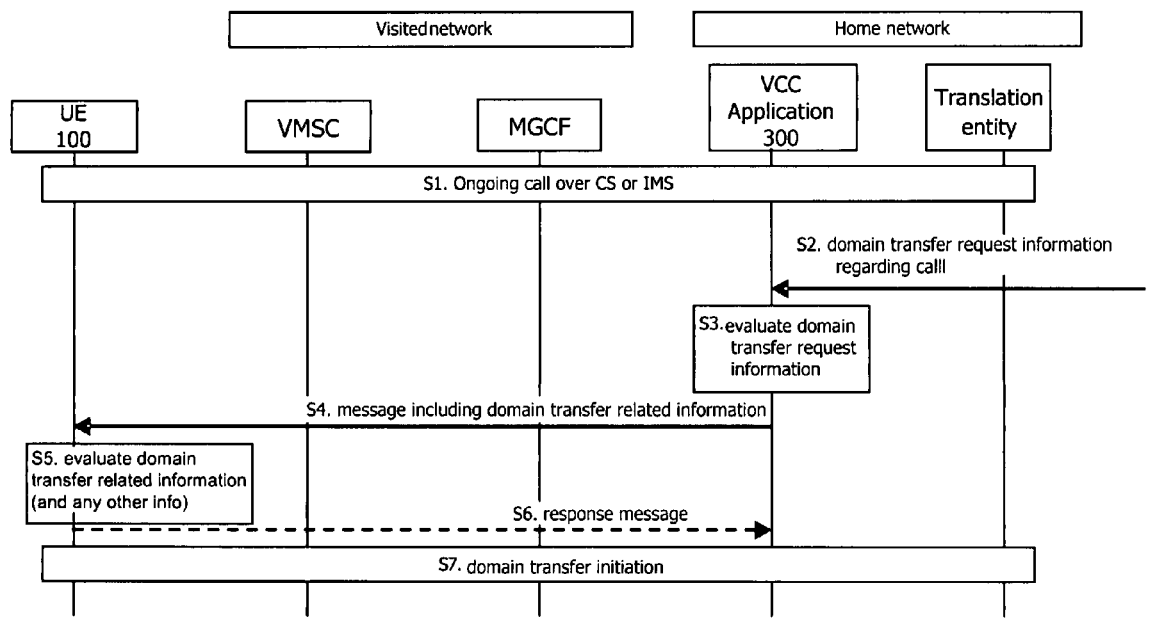
FIG. 3 is a signal flowchart between a UE and a VCC application for illustrating a method for generating and transmitting a domain transfer request in accordance with one embodiment of the present invention.

FIG. 3 is a signal flowchart between a UE 100 and a VCC application 300 for requesting a domain transfer for a call in accordance with one embodiment of the present invention. This method can be implemented in the network architecture of FIG. 1 or in other suitable architecture. For instance, the UE 100 and the VCC application 200 of FIG. 3 can be respectively the UE 10 and the VCC application 30 of FIG. 1.

Referring to FIG. 3, a call is currently in progress (i.e., ongoing call) between the UE 100 and the VCC application 300 over the CS domain or IMS domain (S1). Here, it is assumed in FIG. 3 the ongoing call is in progress over the CS domain. The ongoing call may denote a call which has been initiated in the CS domain, but it may also be a call which was initiated in the IMS domain and has been transferred to the CS domain.

During the ongoing call in progress between the UE 100 and the VCC application 300, the VCC application 300 (i.e., a type of network server) receives from an external node (e.g., a node that controls operator policy, a node that controls mobility management, etc.) a request (or signal, information, or the like) for requesting a domain transfer from a current domain (e.g., the CS domain) to another domain (e.g., the IMS domain) with respect to a call placed by a specific user (i.e., a user of the UE) (S2). As a variation, the VCC application 30 can receive this request from an internal module (e.g., 30a, 30b, 30c, 30d, or other in FIG. 1) of the VCC application 300.

The domain transfer request made by the network (e.g., from the external node or internal module) in step S2 may be made by several reasons, for example, maintenance of a network, traffic load of a specific node in the network, control related to operator policy, or the like. The domain transfer request may be specifically made to apply to one (single) terminal which a certain VCC subscriber is using, or to a certain group (e.g., other VCC subscribers) of terminals, or may be non-specifically made to apply to multiple subscribers (e.g., terminals used by the multiple subscribers).

In step S2, as mentioned above, the domain transfer request may not only be transmitted from the network (i.e., the external node) to the VCC application 300, but can also be made (triggered) based upon a specific internal state of the VCC application 300. For instance, in order to regulate or maintain a traffic with respect to the VCC application 300, or perform the operator policy related to the domain transfer, for example, a certain entity or module)(e.g., a domain transfer function module, a domain selection function module, etc.) provided in the VCC application 300 may transmit a domain transfer request to a processing unit (e.g., a controller) constructed in the VCC application 300 for processing the domain transfer request signal. When the VCC application 300 receives the domain transfer request (or signal) from the network (e.g., the external node) or its internal component (e.g., a certain entity therein), the VCC application 300 performs an analysis or evaluation of the domain transfer request (S3). Information obtained from this evaluation can be referred to as evaluation information, which can be included in the message sent from the VCC application to the UE in S4 to be discussed later.

In Step S3, for instance, the VCC application 300 evaluates the domain transfer request under a previously defined condition, e.g., radio attachment state of the terminal, media type of the ongoing call, etc. (i.e., it checks whether the requested domain transfer is appropriate for the ongoing call of the UE 300 from the VCC application side). Here, the previously defined condition denotes information related to the domain transfer, the information stored in a certain entity provided in the VCC application or a certain external entity. In other words, the VCC application 300 analyzes or evaluates whether or not a message including domain transfer related information should be generated and/or transmitted to the UE according to the domain transfer request. Here, the domain transfer request may be specific for a terminal which a certain subscriber is using or for terminals which a certain group of subscribers are using.

Then in step S4, the message including the domain transfer related information is sent from the VCC application 300 to one or more UEs 100. The domain transfer related information includes domain transfer level information, and can further include at least one of network state information and evaluation information. The domain transfer related information is now discussed in more detail.

In step S3, when the VCC application 300 evaluates the domain transfer request, it decides (or evaluates) what level (or class) the domain transfer request should be assigned to and generates the domain transfer level information indicating the level of domain transfer request. The levels of the domain transfer request, for example, may be classified into first to third levels (or classes). Examples of these levels (domain transfer level information) can be as follows, but the invention is not limited thereto:

A first level of domain transfer request, which is so-called "shall be" (must be), is to request that the domain transfer shall be (must be) performed (e.g., if not, the call will be disconnected in a short time);

A second level of domain transfer request, which is so-called "should be" (should preferably be), is to request that the domain transfer should be performed (e.g., if not, the call will risk being disconnected due to resources shortage, etc.); and A third level of domain transfer request, which is so-called "requested" (can be), is to request the domain transfer be performed by a selection of the UE based upon a traffic load, for example (e.g., for load balancing, but up to the UE).

These levels of the domain transfer request can be represented by using different values of a parameter for indicating the levels of the domain transfer request, by using different parameters corresponding to different levels, by using a type of indicator, or by using other ways.

Accordingly, the domain transfer related information sent from the VCC application 300 to the UE(s) in step S4 includes the domain transfer level information which indicates a level of domain transfer request, which can be, e.g., one of the first to third levels discussed above.

As a variation, the message sent from the VCC application to the UE(s) in step S4 can include a request to initiate a domain transfer, without including the above domain transfer level information. Also, one of different or dedicated messages corresponding respectively to different levels of the domain transfer request can be sent from the VCC application server to the UE(s). For instance, there may be messages dedicated to indicate different levels of a domain transfer request. Also, there may be other levels of the domain transfer request, for the domain transfer level information.

Also as mentioned above, the domain transfer related information (S4) may include associated information regarding the domain transfer request made by the network that the VCC application has evaluated in step S3, and information related to the evaluation. That is, the domain transfer related information can include the evaluation information. Also, the domain transfer related information can include other information (e.g., the network state information regarding the network state, etc.).

Also the domain transfer related information or the message including the domain transfer related information can be included or combined with a message for other purpose, and/or can share the signaling space with other functionality.

In Step S4, the VCC application 300 transmits the message including the domain transfer related information to the UE 100, which can occur via a VCC UE-VCC application server reference point, i.e., a V3 interface (e.g., V3 interface 20), or using a unicast method. As a variation, the message including the domain transfer related information can be simultaneously sent from the VCC application 300 to a plurality of UEs, e.g., via a multicasting method or a broadcasting method.

After receiving the message including the domain transfer related information from the VCC application 300, the UE 100 (or each UE) evaluates (or analyzes) the information included in the message (S5). The UE 100 then sends a response message (e.g., Ack message) to the VCC application 300 in response to the received message (S6). Here, the response message may include information indicating the decision of the VCC application (and/or UE) with respect to the domain transfer request. For example, the decision on the domain transfer request may indicate an acceptance or rejection of the domain transfer request made by the VCC application. Step S6 may be performed between steps S4 and S5, and can be an optional step.

The UE 100 selectively performs (initiates) a domain transfer of the call (e.g., ongoing call) by taking into account the information related to the domain transfer request which has been evaluated in step S5 (S7). Here, when deciding whether or not to initiate the domain transfer of the call, the UE can take into account, as a factor which affects the decision, the information related to the domain transfer request (i.e., the domain transfer related information included in the message, as a first factor) together with other factors that the UE has already contained. Examples of the other factors can be, but are not limited to, user preferences as a second factor) and operator policy as a third factor). Also, priority (level) among these factors (e.g., the first, second and third factors) for making the decision on the domain transfer may be defined according to a user's setup or an operator's setup. For instance, if the first and third factors conflict with each other (e.g., the first factor indicates that the domain transfer should be initiated, whereas the third factor does not), then the UE 100 may decide to follow the first factor according to the setup.

In one example, in step S5, the UE 100 can decide whether or not to initiate a domain transfer for the current call based on the domain transfer related information and at least one of the operator policy and user preferences.

Meanwhile, the reference point between the UE 100 and the VCC application 300 can be implemented by use of interfaces or protocols which have been defined, and also be implemented by defining new interfaces. For example, the reference point may be implemented by use of an IMS-based signaling, or by the combination of other interfaces.

In the above example of FIG. 3, the call is an ongoing call (e.g., an outgoing or incoming call), but the invention is equally applicable to any subsequent call. For instance, the UE 100 can receive the domain transfer related information from the VCC application 300 in S4. Then the UE 100 can store this information and then evaluate it later for a domain transfer of any subsequent call, as desired.

Hereinafter, constructions and operations of the UE 100 (i.e. a terminal) and the VCC application 300 (i.e., VCC application server) according to an embodiment of the present invention will be explained.

The UE 100 according to the present invention may include a primary hardware construction which is required to process a message including domain transfer related information.

Figure 4:
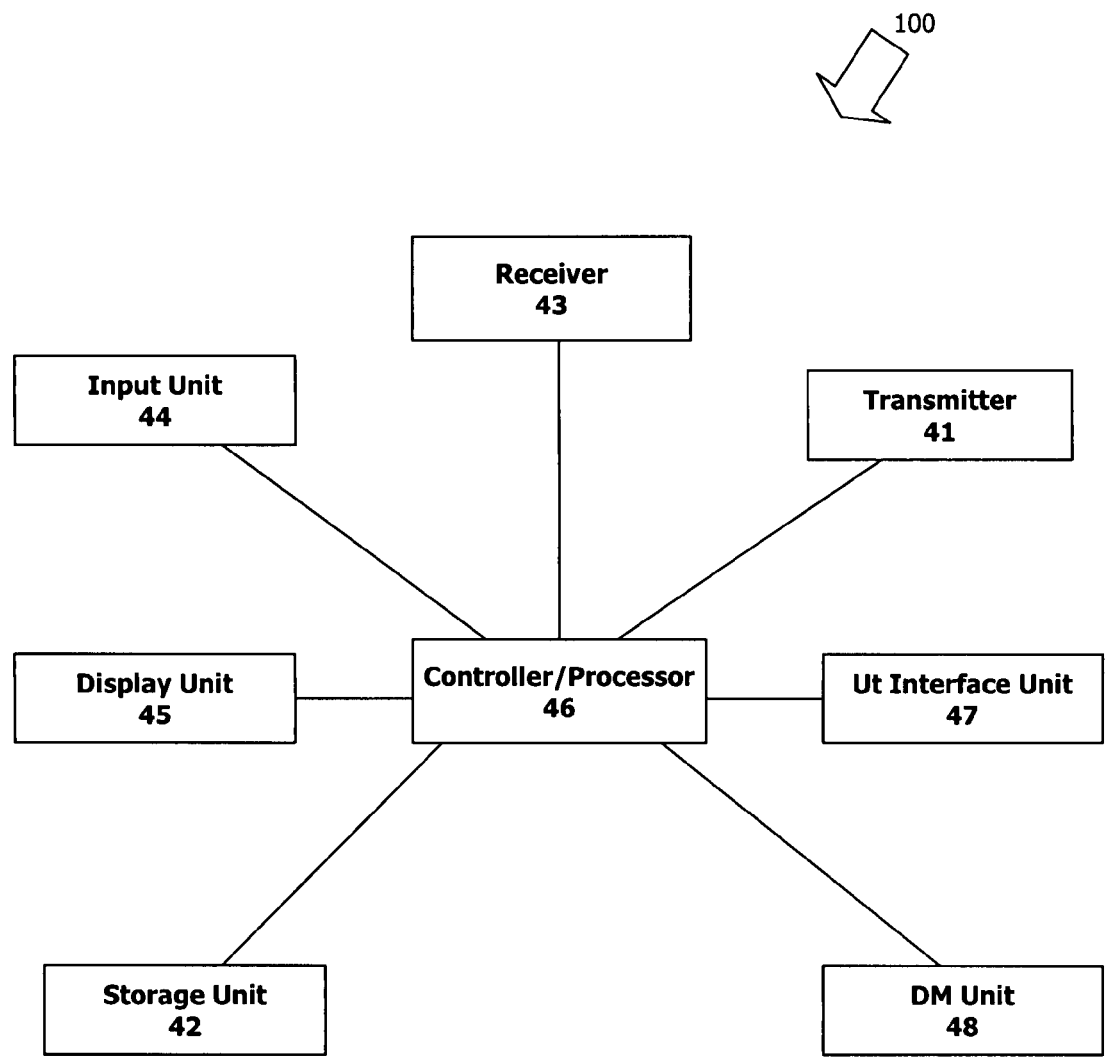
FIG. 4 is a block diagram of a terminal or UE according to an embodiment of the present invention.

For instance, as shown in FIG. 4, the UE 100 according to the present invention comprises a receiver 43 adapted to receive a domain transfer request message (or a message) including information (domain transfer related information) related to the domain transfer request from the VCC application, a transmitter 41 adapted to send (transmit) a response message (e.g., Ack message) with respect to the received domain transfer request message, a memory or storage unit 42 for storing the received domain transfer related information and other information such as operator policy, user preferences, etc., and a VCC enabler 46 adapted to evaluate (or analyze) the domain transfer related information included in the domain transfer request message (and any other information as desired) to decide whether or not the domain transfer of an ongoing call should be initiated (performed), to add (or include) information obtained by the decision (e.g., acceptance or rejection) to the response message, and to selectively attempt to initiate the domain transfer according to the decision. Here, the VCC enabler 46 may be a controller as a type of controlling unit for analyzing the domain transfer related information in order to attempt to initiate the domain transfer. The UE 100 may also include other components such as a Ut interface unit 47, a DM unit 48, an input unit 44, and a display unit 45. All components of the UE 100 are operatively coupled.

As aforementioned, the operations and functions of each component of the UE which includes technical features of the present invention have been explained. Besides, other basic components of the UE for receiving a VCC service are obvious to those skilled in the art, and the explanation thereof is thus omitted.

The VCC application 300 according to the present invention comprises a receiver for receiving domain a domain transfer request (transfer request information) from a network (e.g., an external node) due to a change in operator policy with respect to the domain transfer according to the network state or for the network maintenance or for some other reason, and receiving a response message (i.e., Ack message) transferred from the UE 100, an evaluating unit for evaluating (or analyzing) the received domain transfer request by comparing it with previously stored conditions, a message generator for generating a message including domain transfer related information based upon the evaluated domain transfer request, and a transmitter for sending the generated message to the UE(s) 100. Here, since the message including the domain transfer related information is generated by the evaluating unit and the message generator for the purpose of requesting the domain transfer, the evaluating unit and the message generator may be implemented as a type of controller which is capable of performing the combined functions of both the evaluating unit and the message generator.

The present invention has been explained with reference to embodiments illustrated in the drawings, which, however, are just exemplary. It will also be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

As described above, the present invention is advantageous because it allows the network server (e.g., the VCC application) to request the domain transfer from the UE according to the network state or if necessary. In addition, the present invention allows the network server to supply the UE with relevant information (domain transfer related information) needed for the UE to make a proper informed decision about whether or not to initiate the domain transfer for its call.

Furthermore, the present invention allows the network server to request the domain transfer from the UE according to the network state or for the network maintenance. Accordingly, the UE does not initiate the domain transfer for the calls unnecessarily and can initiate the domain transfer only when the network can perform/complete the domain transfer. As a result, the present invention can effectively prevent deterioration of Quality of Service (QoS) or wasting of signaling or radio resources.

The invention claimed is:

1. A terminal for controlling a domain transfer operation, comprising:
   a receiver to receive a message from a network server, the message including domain transfer related information; and
   a controller to evaluate the domain transfer related information and at least one of user preference information and operator policy information, to determine whether to initiate a domain transfer of a call based on the evaluation result, and to selectively initiate the domain transfer based on the determination result.

2. The terminal of claim 1, wherein the call is an ongoing call or any subsequent call originating after receiving the message.

3. The terminal of claim 1, wherein the domain transfer related information includes domain transfer level information indicating a level of a domain transfer request.

4. The terminal of claim 3, wherein the level of the domain transfer request is one of the following:
   a first level which indicates that the domain transfer must be performed;
   a second level which indicates that the domain transfer should preferably performed; and
   a third level which indicates that the domain transfer can be performed.

5. The terminal of claim 3, wherein the controller determines whether to initiate the domain transfer by evaluating the domain transfer level information, the user preference information, and the operator policy information.

6. The terminal of claim 1, wherein the receiver receives the message from the network server through a V3 interface, a unicast method, a broadcasting method, or a multicasting method.

7. The terminal of claim 3, wherein the domain transfer related information further includes at least one of network state information and evaluation information regarding an evaluation of a domain transfer request by the network server.

8. The terminal of claim 1, further comprising:
   a transmitter to transmit a response message to the network server in response to the message.

9. The terminal of claim 1, wherein the receiver receives the message as part of a message for other purpose.

10. A terminal for controlling a voice call continuity (VCC) operation, comprising:
    a receiver to receive a message from a network server, the message including domain transfer related information; and
    a controller to evaluate the message including the domain transfer related information, to determine whether to initiate a domain transfer of a call based on the evaluation result, and to selectively initiate the domain transfer based on the determination result.

11. The terminal of claim 10, wherein the call is an ongoing call or any subsequent call originating after receiving the message.

12. The terminal of claim 10, wherein the domain transfer related information includes a request for a domain transfer.

13. The terminal of claim 10, wherein the message further includes network state information and evaluation information regarding an evaluation of a domain transfer request performed by an evaluator of the network server, and
the controller determines whether to initiate the domain transfer by evaluating the domain transfer related information, the network state information and the evaluation information.

14. The terminal of claim 10, wherein the receiver receives the message as part of a message for other purpose.

15. A network device for controlling a domain transfer operation, comprising:
a controller to analyze domain transfer request information based on criteria information, and to generate a domain transfer request message based on the analysis result; and
a transmitter to transmit the domain transfer request message to at least one terminal, for controlling the terminal to selectively initiate a domain transfer of an ongoing call.

16. The network device of claim 15, wherein the network device is a voice call continuity (VCC) application server.

17. The network device of claim 15, wherein the domain transfer request message includes domain transfer related information indicating one of the following:
the domain transfer must be performed;
the domain transfer should preferably performed; and
the domain transfer can be performed.

18. The network device of claim 15, wherein the transmitter transmits the domain transfer request message to a plurality of terminals simultaneously.

19. The network device of claim 15, wherein the transmitter transmits the domain transfer request message to a plurality of terminals using a multicasting method or a broadcasting method.

20. The network device of claim 15, wherein the transmitter transmits the domain transfer request message to one terminal through a V3 interface or a unicast method.

21. A server for controlling a domain transfer operation, comprising:
a receiver to receive a domain transfer request;
a controller to evaluate the domain transfer request based on criteria information, to determine whether or not to generate a domain transfer request message based on the evaluation result, and to generate the domain transfer request message based on the determination result; and
a transmitter to transmit the domain transfer request message to at least one terminal so as to selectively initiate a domain transfer for a call.

22. The server of claim 21, wherein the receiver receives the domain transfer request from an external node or an internal module of the server.

23. The server of claim 21, wherein the domain transfer request message includes domain transfer related information indicating one of the following:
the domain transfer must be performed;
the domain transfer should preferably performed; and
the domain transfer can be performed.

24. The server of claim 21, wherein the domain transfer request message further includes network state information and evaluation information regarding the evaluation of the domain transfer request performed by the controller.

25. A method of controlling a domain transfer operation, comprising:
determining, by a network server, whether or not to request an initiation of a domain transfer of a call;
generating, by the network server, a message based on the determination result, the message including a request to a terminal for an initiation of a domain transfer of a call; and
transmitting, by the network server, the message to at least one terminal.

26. The method of claim 25, wherein the determining step includes:
receiving a domain transfer request from an external node or an internal module of the network server;
analyzing the received domain transfer request based on criteria information; and
deciding whether the initiation of the domain transfer is to be requested based on the analyzed result.

27. The method of claim 25, wherein the message includes domain transfer related information indicating one of the following:
the domain transfer must be performed;
the domain transfer should preferably performed; and
the domain transfer can be performed.

28. The method of claim 27, wherein the message further includes network state information, and evaluation information regarding analyzing performed in the analyzing step.

29. The method of claim 25, wherein the transmitting step transmits the message to a plurality of terminals using a multicasting method or a broadcasting method.

30. The method of claim 25, wherein the transmitting step transmits the message to one terminal through a V3 interface or a unicast method.

31. A method for controlling a domain transfer operation, comprising:
receiving, by a terminal, a domain transfer request message from a network server, the domain transfer request message including domain transfer related information;
evaluating, by the terminal, the domain transfer related information and at least one of user preference information and operator policy information;
determining, by the terminal, whether to initiate a domain transfer of an ongoing call based on the evaluation result; and
selectively initiating, by the terminal, the domain transfer of the ongoing call based on the determination result.

32. The method of claim 31, wherein the domain transfer related information includes domain transfer level information indicating a level of a domain transfer request.

33. The method of claim 32, wherein the level of the domain transfer request is one of the following:
a first level which indicates that the domain transfer must be performed;
a second level which indicates that the domain transfer should preferably performed; and
a third level which indicates that the domain transfer can be performed.

34. The method of claim 32, wherein the controller determines whether to initiate the domain transfer by evaluating the domain transfer level information, the user preference information, and the operator policy information.

35. The method of claim 31, wherein the receiver receives the domain transfer message from the network server through a V3 interface or a unicast method.

36. The method of claim 31, wherein the domain transfer related information further includes at least one of network state information and evaluation information regarding an evaluation of a domain transfer request performed by the network server.

* * * * *